United States Patent [19]

Ericson

[11] 4,244,543
[45] Jan. 13, 1981

[54] SUPPORT ROLLER OR ROCKER FOR HOT EXPANDING PIPE LINES

[75] Inventor: Ernest A. Ericson, Channelview, Tex.

[73] Assignee: Exxon Research & Engineering Co., Florham Park, N.J.

[21] Appl. No.: 1,629

[22] Filed: Jan. 8, 1979

[51] Int. Cl.³ .............................. F16L 3/18; F16L 3/22
[52] U.S. Cl. ....................................... 248/55; 138/106
[58] Field of Search .................. 138/106, 107; 248/55

[56] References Cited

U.S. PATENT DOCUMENTS

| | | | |
|---|---|---|---|
| 425,856 | 4/1890 | Brislin | 248/55 |
| 1,645,762 | 10/1927 | Lohbiller | 248/55 |
| 2,103,811 | 12/1937 | Davis | 248/55 |
| 2,738,151 | 3/1956 | Herzog | 248/55 |
| 3,026,858 | 3/1962 | Fleischer | 248/55 X |

*Primary Examiner*—James C. Mitchell

[57] ABSTRACT

An expansion roller or rocker assembly is provided for use in raising and supporting a length of expandable conduit, e.g. tube or pipe, and also permitting free longitudinal movement of the pipe upon its expansion and subsequent contraction without any rigid connection to the pipe itself. The expansion roller or rocker assembly is specially adapted for use when numerous pipes in complex networks are supported by overhead stanchion configurations, having tiers of horizontal support members, whereby expansion loops therein can be utilized without the necessity for blocking pipe routes and, in the case of steam lines, without the necessity for steam traps. All of this is accomplished without putting a torque on the support stanchion or beam.

9 Claims, 10 Drawing Figures

FIG. 9.
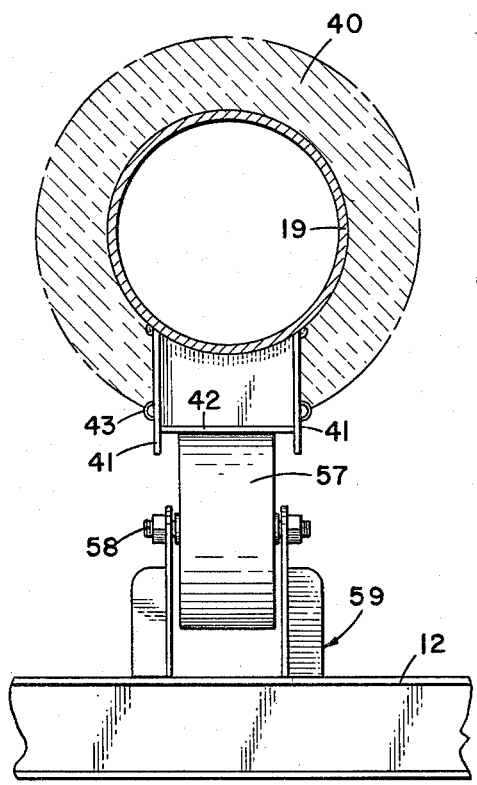
FIG. 8.
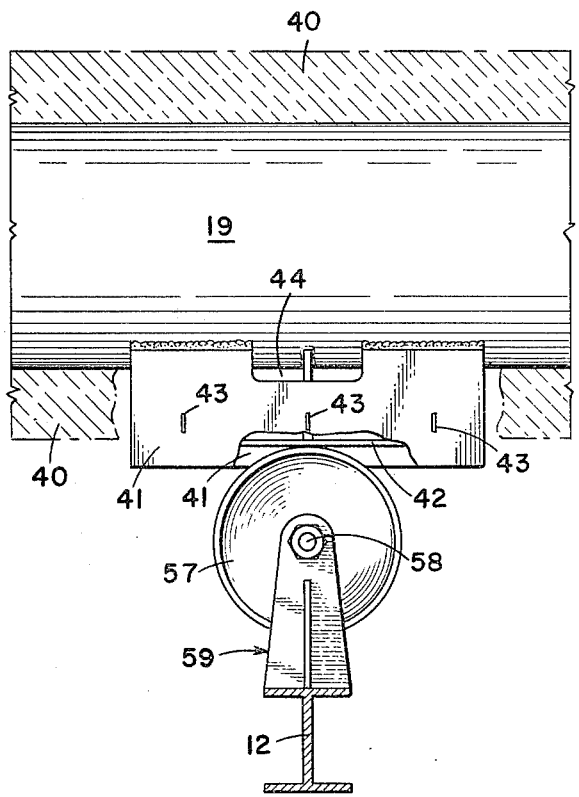
FIG. 7.
PRIOR ART
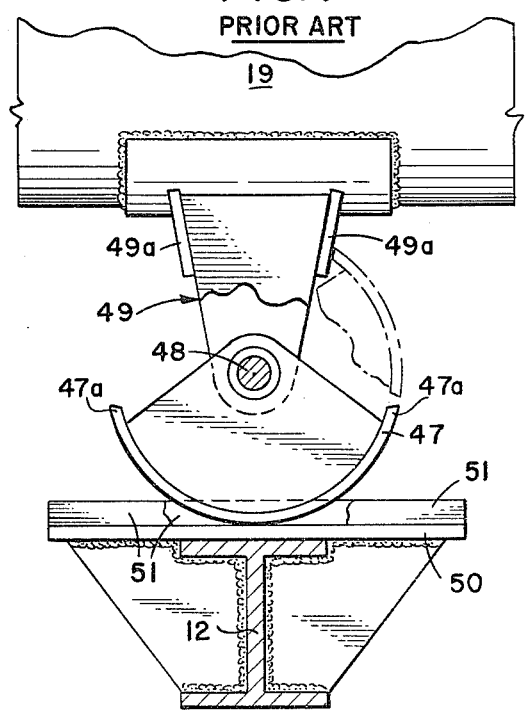
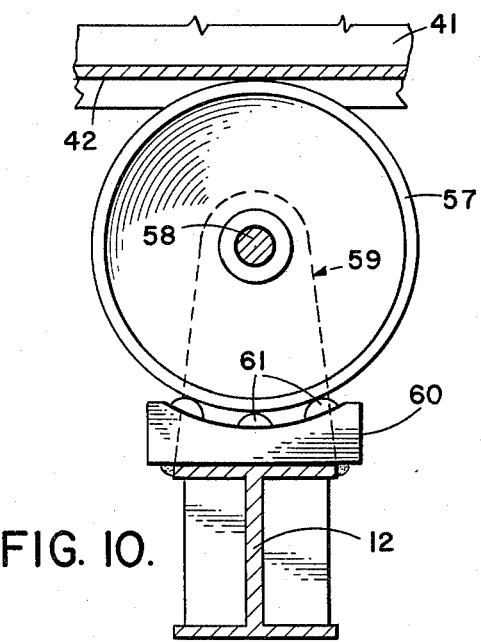
FIG. 10.

SUPPORT ROLLER OR ROCKER FOR HOT EXPANDING PIPE LINES

CROSS-REFERENCES TO RELATED APPLICATIONS

There are no applications on file by this inventor or his assignee related to this present application.

BACKGROUND OF THE INVENTION AND PRIOR ART

The art is aware of numerous ways of accommodating the expansion and contraction of conduits such as pipes by providing movable means at the points where they are supported by either hangers or brackets. One conventional technique is to utilize pin rollers of relatively narrow diameter of various forms which underlie the conduit and rotate on a bushing mounted on an axle, thereby turning as the conduit moves during expansion and contraction. These rollers can be also provided with trunnions or bearings which are also supported on brackets or other means provided as the supports for the conduits. Examples of this type of tube support are shown in U.S. Pat. No. 3,026,858, U.S. Pat. No. 1,645,762, U.S. Pat. No. 425,856 and U.S. Pat. No. 2,893,669.

Another means for supporting a pipe whereby expansion of the pipe upon heating and contraction upon cooling is provided as shown in U.S. Pat. No. 2,738,151. This describes a rocker base member in which the rocker base rests on, but is unattached to a support member and has an upper plate support member which is rigidly attached to the pipe which is to be permitted to expand and contract. The present invention is an improvement of U.S. Pat. No. 2,738,151.

The disadvantage of the arrangement of the '151 patent is multi-fold. One problem is that periodically along the length of the pipe rigid support members must be welded directly to the pipe. This requires the pipe itself to be structurally stronger than conventional design. It also requires an extraordinary weld that must tolerate a variety of multidirectional stresses and do not distort or break the pipe itself.

And most importantly, if the rocker described in '151 rested on top of an elevated horizontal support, it would inevitably transfer its load point in a twisting moving relationship so that a support designed to carry a given load at a given point would be subjected to undue variable stresses and twistings, which can lead to breaking or deformation. It would be difficult, if not impossible, to design any support member that could withstand such an intense variation in load stresses.

BRIEF DESCRIPTION OF THE DRAWINGS

FIG. 7 is a view of the prior art with an additional stop and track feature.

FIG. 8 is a detailed view of the roller means embodiment of the invention.

FIG. 9 is a side view of FIG. 8.

FIG. 10 is a side view of a castor embodiment to support the roller member of FIG. 8.

BRIEF SUMMARY OF THE INVENTION

Figure 1:
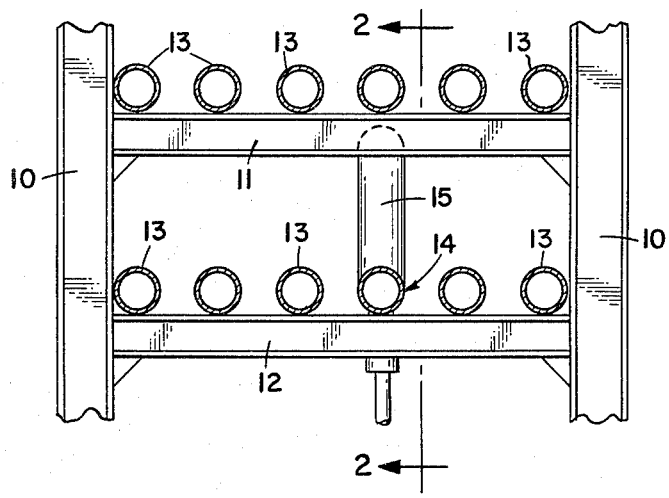
FIG. 1 is a schematic showing a typical rack section of pipes in which one hot pipe is accompanied by several nonhot pipes located on a pair of stanchion with horizontal support members.

Expansion roller or rocker assembly means for supporting pipes suspended in the air, whereby said means are rigidly connected to supporting stanchions and whereby pipes or conduits supported by said means, engage the said means in a freely movable relationship in the longitudinal direction of said pipes. The inventive means has exceptional utility for providing a slightly elevated position for one or more bulky pipes in a parallel relationship to avoid large spacings between the pipes.

DETAILED DESCRIPTION OF PREFERRED EMBODIMENTS

It has been discovered and forms an essential feature of this invention that means can be provided for supporting expansion pipe lines off the ground whereby free movement of the hot expanding pipe line can be attained while at the same time permitting use of horizontally oriented expansion loops on such expanding pipelines, whereby the loops which will not block pipe routes for other pipes on stanchion designed to carry multiple pipes in a close parallel relationship on a horizontal plane.

It is common to mount high-temperature pipe lines on stanchions, which are essentially vertical support means, with one end rigidly anchored to the ground and the other end providing support for above the ground members. Such stanchions are generally arranged in rows with tiers of horizontal support means there between to carry multiple pipes. Some of the pipes will be high-temperature pipes and therefore will require expansion loops at regular intervals in order to accommodate the thermal expansions and contractions of the pipeline.

Such loops, to avoid the necessity for additional costly fittings, and in the case of steam lines avoid steam traps, are desirably placed in a plane horizontal with the pipe axis. But its horizontal expansion loop would occupy an unacceptably large number of adjacent pipe routes in the horizontal plane on the stanchion rack. Thus, even though such loops are desirable from the standpoint of expansion compensation, they impart an accompanying detriment viewed from another standpoint, e.g. they occupy large amounts of space in the extremely space-limited horizontal support plane supported by the stanchion.

Alternatively, if to overcome the critical spacing problem, an expansion loop is provided in a plane vertical to a pipe axis, in order to not interfere with other pipe routes adjacent to the expansion pipe in the pipeline complex, it will require the next horizontal plane tier support member to be offset to an unduly large extent upward to accommodate the vertical loop.

Moveover, in the case of steam lines, it will require a steam trap. It is an invariable practice that whenever a steam line is offset in the upward direction, a water pocket will be created. Such a pocket requires a trap and release mechanism. Otherwise the water will block off the passage of the steam. However, once such a trap is provided, it will frequently fail to function properly, thus permitting steam to discharge from the system thereby wasting energy. Alternatively, the trap can fail altogether which would cause either excessive release of steam or would cause a blockage whereby no water would exit from the system, thus creating a potential and a real hazard.

If skid shoes were provided on the stanchion, which were high enough to permit the use of a horizontal expansion loop, thus avoiding the necessity for a water or steam trap, they would tend to produce a long movement arm. This would act to exert a forced twisting of the horizontal support beam tier as well as producing a movement on the stanchion itself.

To approach the problem from another direction, if one used rod hangers for supporting the pipe line at a constant elevation, this would require more distance between the support beams, because long rods will be required to accommodate this degree of movement. Thus, such an approach would defeat the objective of attempting to provide for thermal expansion without blocking pipe routes or occupying excess space in the stanchion support beam complex.

It has been found according to one embodiment of the invention, that certain roller supports of specific design will raise and maintain pipe lines at an equal height above adjacent non-expansion pipe lines permitting horizontally oriented expansion lines to be utilized without blocking pipe routes throughout the rest of the stanchion support beam pipe network complex. At the same time, it is not now necessary to utilize the numerous steam traps and elbows which would otherwise be necessary for handling expansion loops oriented in the vertical plane of the longitudinal pipe axis. Alternatively, another embodiment of the invention will utilize rocker support means. Such rocker means can be regarded as only a portion of a roller means. Both, the rocker means and the roller means of this invention are preferred embodiments.

Either the roller or rocker type support means of the invention provide mechanisms whereby the load of the hot pipe line will be located at a predetermined load supporting portion of the support beam at all times. Thus it will not produce a torque or movement on support members as the pipe line expands or contracts. The invention is illustrated in additional detail by referring to the drawings.

Typically in a refinery or a chemical processing plant, a multitude of pipes are used. These form an intricate complex or piping network. The pipes in the network are all frequently arranged on stanchion and support members essentially as shown schematically in the cross-section of FIG. 1 where the vertical support stanchion are shown as members 10 and horizontal cross-beams supports are shown as members 11 and 12. These stanchion and cross-beams are usually constructed of "H" steel girders. Cross-sectional views of pipes 13 as arranged on the stanchion and horizontal support members are also as shown in FIG. 1.

Pipe 14 is provided with an expansion loop 15 which is located in a vertical plane with the axis of pipe 14. It can be seen that the presence of the vertical expansion loop utilizes space which otherwise could be occupied by horizontal cross-beam support members (typically steel beams), and therefore interferes with the efficient arrangement of pipe routes throughout a particular pipe network installation.

Figure 2:
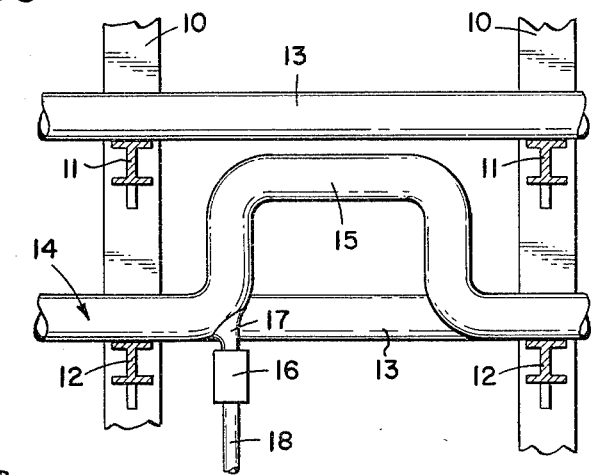
FIG. 2 is a side view showing the detail of the vertical plane loop in a pipe section which is necessary to accomodate the expansion and contraction of the pipe.

FIG. 2 is an enlarged side view taken along cut 2—2 of FIG. 1 showing pipe 14 with expansion loop 15 located on support member 12. Since the expansion loop extends vertically in an upward direction, it requires that a steam trap 16 be located at orifice 17 so that water which condenses at the turn can be removed from the system through orifice 17 by means of steam trap 16 and through escape line 18.

Figure 3:
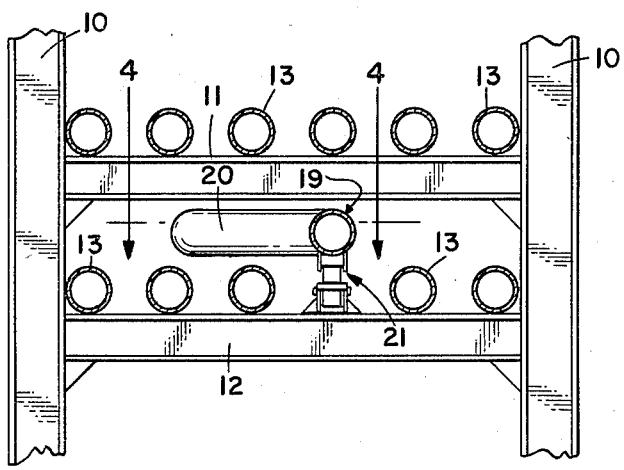
FIG. 3 is a schematic showing a typical rack section similar to FIG. 1 except that the rocker assembly of the invention is used and the expansion loop is in a horizontal plane.

Turning now to FIG. 3, a similar stanchion construction made of horizontal and transverse steel "H" beams is shown in which pipe 19 with expansion loop 20 is provided with either the rocker assembly mechanism 21 of the invention or the roller assembly modification. In such a mode, pipe 19 is raised sufficiently above adjoining pipes 13 so that expansion loop 20, which is in a horizontal plane with respect to pipe 19's axis, is located slightly above pipes adjacent to pipe 19 in its same horizontal plane. It is evident that the adjacent pipes do not need to be widely spaced in such a plane to accommodate loop 20.

Installation of the expansion loop in the horizontal plane provides at least two important advantages. They are that much pipe routing space is preserved in the pipe network configuration shown. Moreover, the use of a loop in the horizontal position eliminates the requirement for steam traps for water escape, thereby avoiding problems that usually arise with this type of mechanism.

Figure 4:
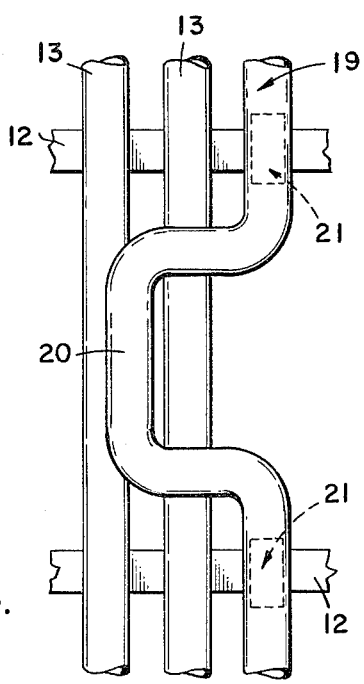
FIG. 4 is a side view showing the detail of a pipe with a horizontal plane expansion loop.

A top expanded view of pipe 19 from FIG. 3 is taken along cut FIG. 4 so that the configuration of expansion loop 20 of pipe 19 can be seen in relationship to the other pipes 13 which rest on horizontal support member 12.

Figure 6:
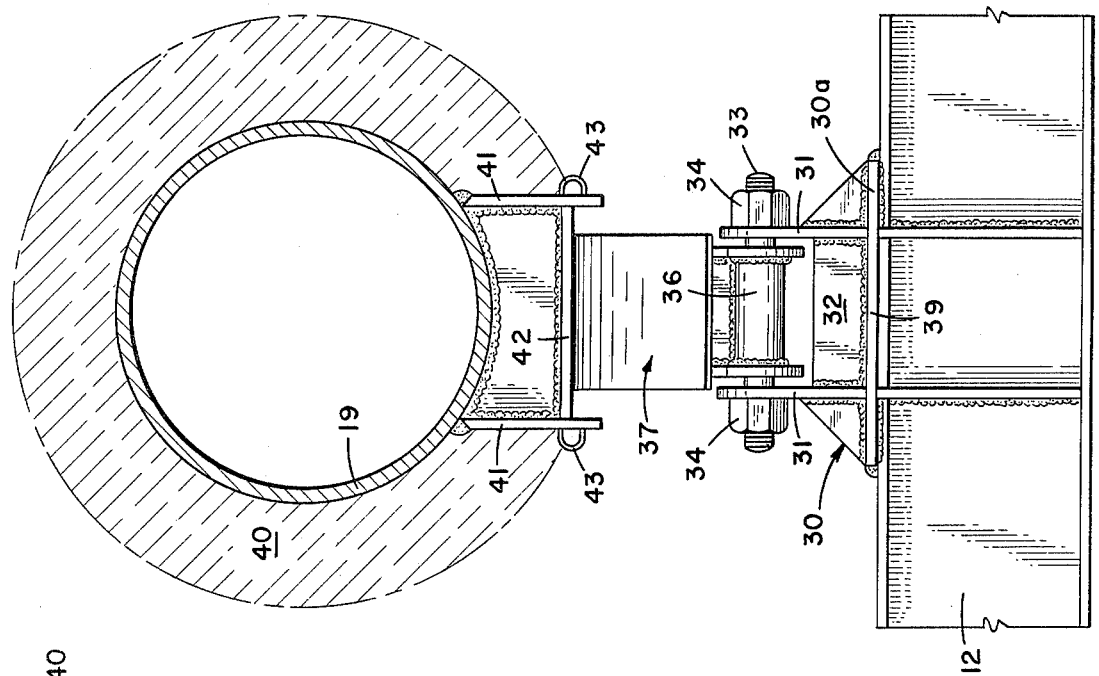
FIG. 6 is a side view of FIG. 5.
Figure 5:
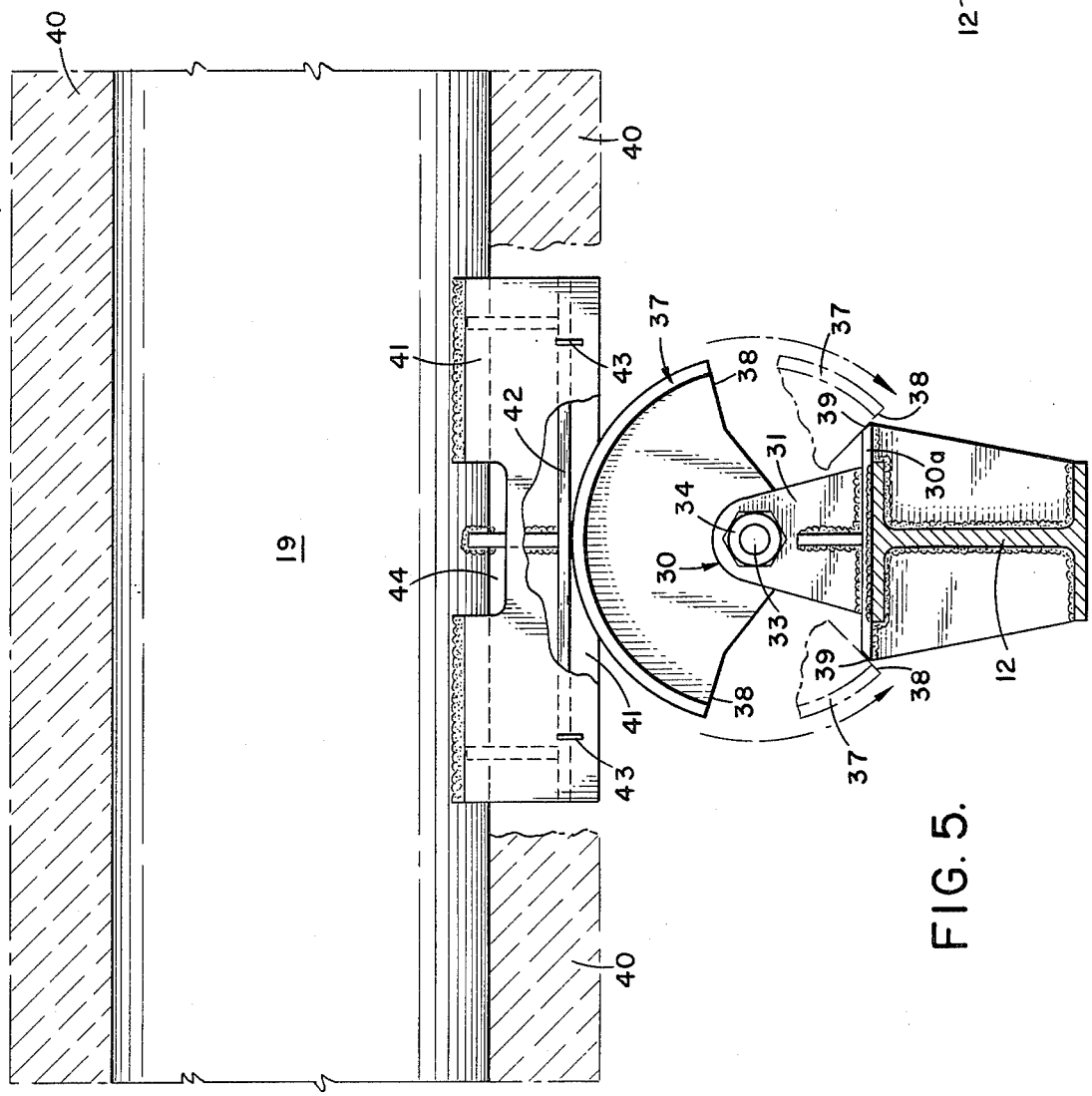
FIG. 5 is a detailed view of the rocker means embodiment of the invention.

A detailed depiction of the rocker arm assembly means embodiment of the invention is illustrated in FIGS. 5 and 6. In these figures a horizontal support member, which is usually an "I" or "WF (Wide Flange)" "H" beam 12, is shown in cross section. Welded to beam 12 in a rigid configuration is a base member 30 having two upwardly extending spaced parallel flanges 31. To support flanges 31 and to maintain the spaced relationship rigidly affixed member 32 is provided, which is fixedly joined to the insides of flanges 31 and to the upper portion of bottom plate 30a of support member 30. Flanges 31 are provided with orifices through which a pivot pin 33 extends which is maintained in place by nuts 34. A sleeve bearing member 36 is rotatably mounted on pin 33 and is rigidly connected to rocker number 37.

From a practical standpoint, rocker member 37 can be conveniently constructed by cutting out a section of a pipe. Generally, the pipe segment will subtend about a 150° arc.

The rocker member as illustrated, forms approximately only about 150° or about 1.66 quadrants. The rocker member 37 dimensions are also chosen so that preferably the diameter as measured from pin 33 has a greater dimension than half the width of horizontal bottom plate member 30a of base member 30, thereby permitting edges 38 of rocker 37 to abut against and be stopped by the edges 39 of the plate 30a, thus inhibiting a complete rotation of the rocker 37. If the rocker embodiment is used as in FIGS. 8 and 9, a complete rotation of the rocker is permitted.

In the embodiment of FIGS. 5 and 6, the insulation has been removed from a segment of the pipe 19 and a special shoe welded to the bottom of the pipe to make contact with the top of the rocker member 37.

The shoe consists of two rectangular steel plates 41 placed in a parallel relationship to which a bottom plate attached perpendicularly therebetween, by welding, serves also as a spacer.

The plate 42 is positioned so as to allow the lower portion of the plates 41 to extend below it, thereby providing parallel flanges at the bottom of the shoe. The plates 42 and the flange portions of the plates 41 serve as a trackway, which contacts the top of the rocker member 37.

The box-shaped shoe can be filled with insulation through the openings 44 in the plates 41. The shoe is provided with insulation tie loops 43, whereby the remaining insulation on the pipe may be anchored securely to the shoe.

The shoe serves the primary role of providing a rigid track to guide and to prevent the pipe from moving side-wise or laterally as it expands. This preserves space on the pipe network route and prevents loss of control by undue lateral movement of the pipe.

FIG. 7 shows certain features necessary to make a prior art apparatus useful. Rocker member 47 used in place of rocker member, 37 of FIGS. 5 and 6, is rotatably mounted on a pin 48, supported by a bracket member generally designated as 49 and which is welded to the bottom of the pipe 19. The rocker 47 contacts a plate member 50, which is fixed to the top of beam 12. Plate 50 is provided with upwardly extending side flanges 51 which act to retain the rocker 47 on the plate member 50. Rotational movement of the rocker 47 is limited by abutment of edges 47a of the rocker 47 against side plates 49a of the bracket 49. Even with these improvements, the prior art device suffers from the defects detailed above.

In FIGS. 8 and 9 a roller member 57 is used in place of the rocker 37 of FIGS. 5 and 6. The roller 57 is rotatably mounted on a pin 58 of a support bracket 59 fixed to the top flange of a beam 12. The roller 57 can be formed of a complete section of pipe and allows 360° rotational ability. The roller 57 rolls on the track of plate 42 which is identical to that of FIGS. 5 and 6. Also roller 57 can be optionally supported on a castor assembly 60 fixed to the top of the beam 12. The castor assembly is provided with rockers or balls 6, which bear against the lower side of the roller 57 as shown in FIG. 10.

Although rocker member 37 does not make direct contact with the bottom of the pipe 19 in FIGS. 5 and 6, it is contemplated that such direct contact can be utilized for both the rocker and the roller members. The use of rocker members or roller members is a question of choice depending on the particular supports needed under the circumstances of the overall staunchion configuration.

Having fully illustrated and described the present invention, what is claimed is:

1. A rotatable support apparatus for supporting a length of expandable pipe upon a raised-above-the-ground, fixed, flat, horizontal surface member in the presence of other pipes supported on said member, which applies a constant load to said member under pipe expansion conditions, comprising in combination:
   (i) rolling and guiding contact means comprising a rotatable member having an uniform annular or arcuate cross-section,
   (ii) support means for said rotatable member rigidly attached to said fixed flat surface member,
   (iii) pivot connecting means for said rotatable member which pivotably and rotatably connects said rotatable member to said support member,
   said assembly being so constructed and arranged whereby longitudinal movement of a pipe resting and supported upon said rotatable member causes rotation of said rotatable member upon said pivot connecting means to accommodate said pipe movement without shifting the load movement from said fixed flat surface.

2. The apparatus of claim 1, wherein said rotatable member is arcuate.

3. The apparatus of claim 1, wherein said rotatable member is annular.

4. In a network of parallel pipes having no loops and being supported above the ground in a horizontal plane by a support member, the improvement comprising the inclusion of at least one supported pipe assembly for permitting hot pipe expansion, comprising in combination:
   (a) an expandable pipe having an expansion loop,
   (b) at least two of the rotatable support apparatus means of claim 1 and whereby the non-expansion loop portion of said expandable pipe rests upon said two support apparatus and wherein said expansion loop is located in a horizontal plane with reference to the axis of the said pipe and wherein said plane is located above said horizontal plane, containing said parallel pipes.

5. The network of claim 4, wherein said expandable pipe is insulated and provided with shoe protection means for said insulation at the point of contact between said pipe and said rotatable support means.

6. The network of claim 5, wherein said shoe protection means has downwardly projecting flanges acting to confine and restrict the movement of said expandable pipe in a direction lateral to the longitudinal axis of the said pipe.

7. The network of claim 4, wherein said rotatable member is arcuate.

8. The network of claim 4, wherein said rotatable member is annular.

9. The apparatus of claim 1, wherein said rotatable member is a rocker configuration and stop means are provided to prevent complete rotation of said member.

* * * * *